(12) United States Patent
Ajima et al.

(10) Patent No.: US 9,258,358 B2
(45) Date of Patent: Feb. 9, 2016

(54) PARALLEL COMPUTING SYSTEM AND CONTROL METHOD OF PARALLEL COMPUTING SYSTEM

(71) Applicant: FUJITSU LIMITED, Kawasaki-shi, Kanagawa (JP)

(72) Inventors: Yuichiro Ajima, Kawasaki (JP); Tomohiro Inoue, Kawasaki (JP); Shinya Hiramoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 315 days.

(21) Appl. No.: 14/032,687

(22) Filed: Sep. 20, 2013

(65) Prior Publication Data

US 2014/0019512 A1 Jan. 16, 2014

Related U.S. Application Data

(63) Continuation of application No. PCT/JP2011/056809, filed on Mar. 22, 2011.

(51) Int. Cl.
*H04L 29/08* (2006.01)
*G06F 15/173* (2006.01)

(52) U.S. Cl.
CPC .......... *H04L 67/10* (2013.01); *G06F 15/17381* (2013.01)

(58) Field of Classification Search
CPC . H04L 67/10; H04L 67/1097; H04L 25/0272; G06F 15/17381; G06F 3/067
USPC .......... 709/201, 204, 206, 220, 222, 230, 232
See application file for complete search history.

(56) References Cited

U.S. PATENT DOCUMENTS 5,271,014 A 12/1993 Bruck et al.
5,715,391 A * 2/1998 Jackson ............ G06F 15/17381
710/100

(Continued)

FOREIGN PATENT DOCUMENTS

JP 6-28330 2/1994
JP 7-230435 8/1995

(Continued)

OTHER PUBLICATIONS

International Search Report mailed Apr. 26, 2011 in corresponding International Application No. PCT/JP2011/056809.

(Continued)

*Primary Examiner* — Ruolei Zong
(74) *Attorney, Agent, or Firm* — Staas & Halsey LLP

(57) ABSTRACT

A parallel computing system includes: each computing node including: a first channel receiving data which a preceding node transfers, and transferring received data to a subsequent node; a second channel receiving data which a preceding node transfers, and transferring received data to a subsequent node; and a computational processor receiving data which the first or second channel has received, and transferring processed data to a subsequent node; an input-output node including: a third channel receiving data which the first channel or the computational processor of a preceding node transfers; a fourth channel receiving data which the first channel or the computational processor of a preceding computing node transfers, and transferring the received data to the second channel of a subsequent computing node; and an input-output processor receiving data which the third channel has received, and transferring inputted and outputted data to the first channel of a subsequent computing node.

7 Claims, 9 Drawing Sheets

C-NODE : COMPUTING NODE
IO-NODE : INPUT-OUTPUT NODE

(56) References Cited

U.S. PATENT DOCUMENTS

| | | | |
|---|---|---|---|
| 7,310,332 B2 * | 12/2007 | Kadambi | H04L 69/161 345/501 |
| 7,581,079 B2 * | 8/2009 | Pechanek | G06F 9/3001 712/10 |
| 2001/0052056 A1 * | 12/2001 | Acton | G06F 15/7864 711/147 |
| 2004/0078493 A1 | 4/2004 | Blumrich et al. | |
| 2004/0103218 A1 | 5/2004 | Blumrich et al. | |
| 2007/0162561 A1 * | 7/2007 | Ohara | G06F 3/061 709/217 |
| 2010/0238944 A1 | 9/2010 | Ajima et al. | |
| 2011/0035530 A1 | 2/2011 | Takagi et al. | |

FOREIGN PATENT DOCUMENTS

| | | |
|---|---|---|
| JP | 7-325789 | 12/1995 |
| JP | 2004-536372 | 12/2004 |
| JP | 2004-538548 | 12/2004 |
| JP | 2010-218364 | 9/2010 |
| JP | 2011-39744 | 2/2011 |

OTHER PUBLICATIONS

W. J. Daily et al., "Deadlock-Free Message Routing in Multiprocessor Interconnection Networks," *IEEE Transactions on Computers*, vol. C-36, No. 5, May 1987, pp. 547-553.

* cited by examiner

C-NODE : COMPUTING NODE
IO-NODE : INPUT-OUTPUT NODE

PARALLEL COMPUTING SYSTEM AND CONTROL METHOD OF PARALLEL COMPUTING SYSTEM

CROSS-REFERENCE TO RELATED APPLICATIONS

This application is a continuation application of International Application PCT/JP2011/056809 filed on Mar. 22, 2011 and designated the U.S., the entire contents of which are incorporated herein by reference.

FIELD

A certain aspect of the embodiments is related to a parallel computing system and a control method of the parallel computing system.

BACKGROUND

In a parallel computer in recent years, the necessity for a ring network and a torus network which extended the ring network to multiple dimensions increases. In the parallel computer, a plurality of computing nodes are connected by a network. In the parallel computer, a cost concerning node connection in a network poses a problem as the computing node increases. The ring network is advantageous because the cost concerning connections between many nodes is low.

In the ring network, the cost concerning the node connection is low. Also, the ring network is a symmetrical network. The symmetry of the network is a feature necessary to use the whole network efficiently and equally. Especially, since the parallel calculation program often causes each node to perform regular communication, the symmetry of the network becomes particularly important in the parallel computer. A regular communication pattern is a situation where all network constitution is seen as the same network constitution even if network constitution is seen from any node in the network, and a situation where each node in the network performs data communication by the same algorithm.

On the other hand, the parallel computer is composed of a large number of computing nodes and a small number of input-output node. When the parallel computer calculates, the parallel computer needs to input data from and output data to an external device. An amount of data inputted from and outputted to the external device is generally small, compared with an amount of data transmission between the computing nodes in the parallel computer. For this reason, when input-output devices are attached to only some nodes, a sufficient amount of data can be inputted and outputted. Each of the nodes to which the input-output devices are attached does not generally perform computing, but becomes an input-output node only for input and output of data. When the input-output node which performs input-output processing of data computes, the computing slows, compared with a node which does not perform the input-output processing. In order to perform parallel computing efficiently by the parallel computer, it is important to match the progress of computing and communication of the respective nodes with each other. When the progress of the processing performed by each node has a difference, the efficiency of the parallel computing gets worse.

Conventionally, there has been known a parallel computer with a variable structure distinctive system network in which a plurality of processors are connected by two networks which shared functions (see Japanese Laid-open Patent Publication No. 7-230435). Also, there has been known a parallel computer in which the input-output node is provided on a mesh network (see Japanese Laid-open Patent Publication No. 6-28330).

SUMMARY

According to an aspect of the present invention, there is provided a parallel computing system that has an input-output node and a plurality of computing nodes, the input-output node being connected to the computing nodes via a first and a second transmission paths in which data is transferred in a first direction, the parallel computing system including: each of the computing nodes including: a first channel that receives data which an adjacent preceding input-output node or adjacent preceding computing node transfers, and transfers the received data to an adjacent subsequent input-output node or adjacent subsequent computing node via the first transmission path; a second channel that receives data which an adjacent preceding input-output node or adjacent preceding computing node transfers, and transfers the received data to an adjacent subsequent input-output node or adjacent subsequent computing node via the second transmission path; and a computational processor that receives data which the first or second channel has received, and transfer processed data to an adjacent subsequent input-output node or adjacent subsequent computing node; the input-output node including: a third channel that receives data which the first channel of an adjacent preceding computing node transfers or data which the computational processor of an adjacent preceding computing node transfers; a fourth channel that receives data which the first channel of an adjacent preceding computing node transfers or data which the computational processor of an adjacent preceding computing node transfers, and transfers the received data to the second channel of an adjacent subsequent computing node via the second transmission path; and an input-output processor that receives data which the third channel has received, and transfers inputted and outputted data to the first channel of an adjacent subsequent computing node.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In a parallel computer which connects computing nodes and an input-output node to each other with a ring network or a torus network, it is difficult for the computing nodes to perform communication by using the symmetry of the network. This is because it is difficult to maintain the regular communication pattern by adding an input-output node to the ring network or the torus network. That is, although the respective computing nodes mutually perform the same processing on the program, a part where data overcrowds is generated by adding the input-output node which performs the input and the output intensively, and hence the regular communication pattern cannot be maintained. For example, in the parallel computer called XT of Cray Inc., a part of the nodes connected in the torus network is set as the input-output node only for the input and the output, and hence the network cannot be used effectively with the regular communication pattern.

In a parallel computer which connects only the computing nodes using the ring network or the torus network, the computing nodes are connected to the input-output node, so that another network to which only the computing nodes are connected is required. In a parallel computer called BlueGene of IBM Corp., the computing nodes are connected by the torus network, and each of the computing nodes is connected with the input-output node by a tree network. Each network is efficiently used with the regular communication pattern. However, in the BlueGene of IBM Corp., the computing nodes and the input-output node cannot be connected by a single network. Therefore, the required amount of hardware increases, and the manufacturing cost of the parallel computer increases.

A description will now be given, with reference to the accompanying drawings, of an embodiment of the present invention.

Figure 1:
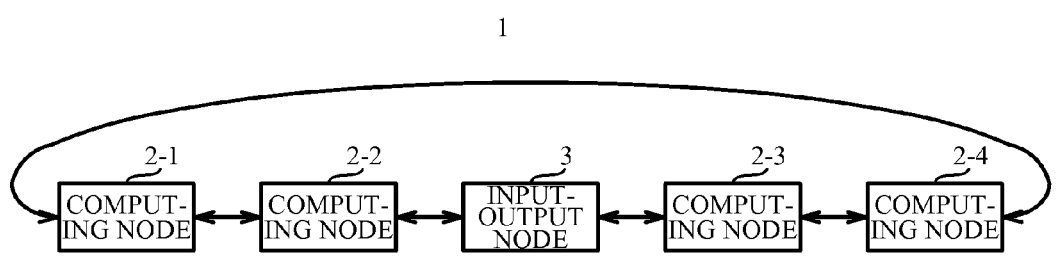
FIG. 1 is a schematic diagram illustrating an example of a parallel computing system according to a present embodiment.
Figure 2A:
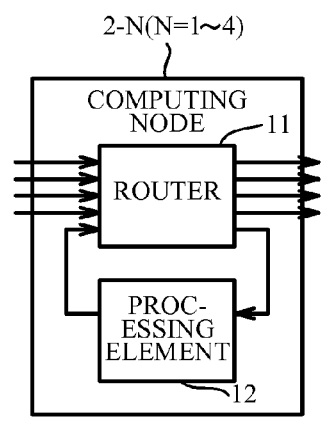
FIG. 2A is a diagram illustrating schematically the configuration of computing nodes included in the parallel computing system of FIG. 1.
Figure 2B:
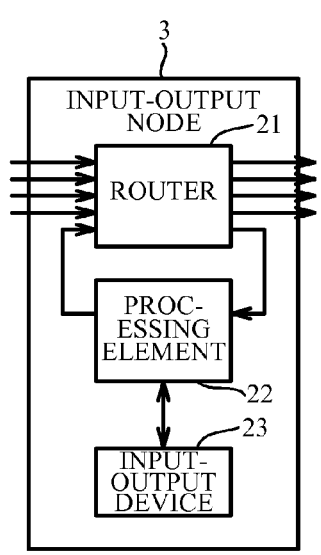
FIG. 2B is a diagram illustrating schematically the configuration of an input-output node included in the parallel computing system of FIG. 1.

FIG. 1 is a schematic diagram illustrating an example of a parallel computing system according to a present embodiment. FIG. 2A is a diagram illustrating schematically the configuration of computing nodes included in the parallel computing system of FIG. 1. FIG. 2B is a diagram illustrating schematically the configuration of an input-output node included in the parallel computing system of FIG. 1.

As illustrated in FIG. 1, a parallel computing system 1 includes computing nodes 2-1 to 2-4 that performs computing of a parallel computing program, and an input-output node 3 that inputs and outputs data from/to an external device. Each of the computing nodes 2-1 to 2-4 and the input-output node 3 has two links for connecting with two adjacent nodes bi-directionally. The computing nodes 2-1 to 2-4 and the input-output node 3 constitutes a ring network. Here, the number of computing nodes and input-output nodes included in the parallel computing system 1 is not limited to the number illustrated in FIG. 1. A network to be employed in the parallel computing system 1 is the ring network or a torus network.

As illustrated in FIG. 2A, each of the computing nodes 2-N (N=1 to 4) includes a router 11 and a processing element 12. The router 11 performs routing of a packet outputted from the adjacent node based on an address included in a header of the packet. The processing element (PE) 12 performs computing for the packet acquired with the router 11 according to the preassigned parallel computing program. Moreover, the processing element 12 replies the computing result to the router 11 if needed.

As illustrated in FIG. 2B, the input-output node 3 has a router 21, a processing element 22, and an input-output device 23. The router 21 performs routing of a packet outputted from the adjacent node and a packet inputted via the input-output device 23, based on an address included in a header of the packet. The processing element 22 performs the computing to the packet inputted and outputted via the input-output device 23. However, the processing element 22 does not perform the computing to the packet acquired with the router 11 according to the parallel computing program, unlike the processing element 12 in the computing node illustrated in FIG. 2A. The input-output device 23 inputs and outputs a packet from/to the external device, not shown. The processing elements 12 and 22 are composed of a CPU (Central Processing Unit), a memory and so on. The input-output device 23 is composed of a communication interface that inputs and outputs the packet from/to the external device.

Figure 3:
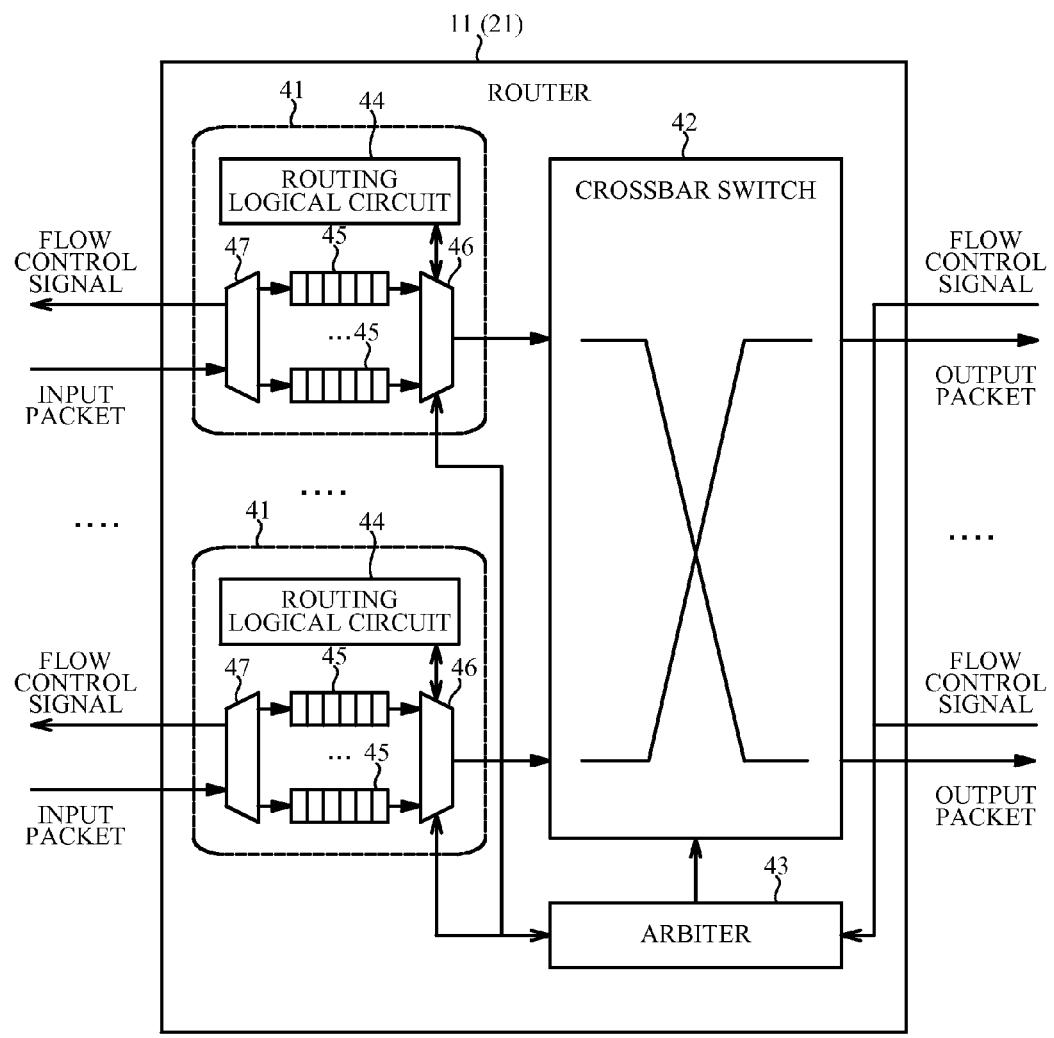
FIG. 3 is a schematic diagram illustrating the configuration of a router 11.

FIG. 3 is a schematic diagram illustrating the configuration of the router 11. Since the configuration of the router 21 is the same as that of the router 11, a description of the configuration of the router 21 is omitted.

In FIG. 3, the router 11 includes a plurality of ports 41, a crossbar switch 42, and an arbiter 43. Each of the ports 41 includes a routing logical circuit 44, a plurality of virtual channel buffers 45, and selectors 46 and 47. A plurality of virtual channels corresponding to the virtual channel buffers 45 is assigned to each port 41.

The selector 47 outputs a flow control signal which controls transfer timing of the packet to the adjacent node, and inputs the packet from the adjacent node or the processing element 12. Each of the virtual channel buffers 45 holds input packets. The routing logical circuit 44 holds a routing rule, and controls routing operation of the router 11. For example, the routing logical circuit 44 determines output directions of the input packets, the completion of the routing, and so on. The routing logical circuit 44 controls the crossbar switch 42 through the arbiter 43 so that the input packets are changed to the virtual channel of a node of an output destination different from the virtual channel of a self-node. The selector 46 outputs the packet held in each of the virtual channel buffers 45 to the crossbar switch 42 based on signals from the routing logical circuit 44 and the arbiter 43. The arbiter 43 outputs an arbitration signal which arbitrates the input packets to the crossbar switch 42, based on a reply signal from the selector 46 and the flow control signal from the node of the output destination, thereby avoiding the collision of the input packets. The crossbar switch 42 dynamically changes the virtual channel of each input packet based on the arbitration signal from the arbiter 43, and outputs each input packet to the node of the output destination or the processing element 12

Figure 4:
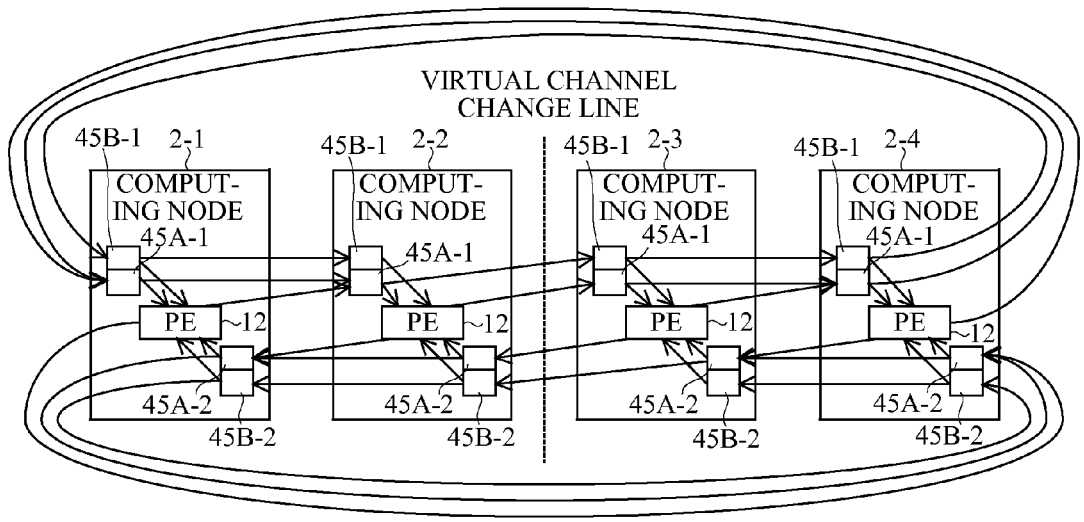
FIG. 4 is a diagram illustrating a dependency between virtual channels when the input-output node is deleted from the parallel computing system of FIG. 1.

FIG. 4 is a diagram illustrating a dependency between virtual channels when the input-output node 3 is deleted from the parallel computing system 1 of FIG. 1.

In FIG. 4, the configuration of the computing nodes 2-1 to 2-4 is illustrated schematically. Each of the computing nodes 2-1 to 2-4 includes the processing element 12, and virtual channel buffers 45A-1, 45B-1, 45A-2 and 45B-2. A route which passes through the virtual channel buffer 45A-1 constitutes a first virtual channel in a right direction. A route which passes through the virtual channel buffer 45B-1 constitutes a second virtual channel in the right direction. A route which passes through the virtual channel buffer 45A-2 constitutes the first virtual channel in a left direction. A route which passes through the virtual channel buffer 45B-2 constitutes the second virtual channel in the left direction.

In a routing rule when the input-output node 3 is deleted from the parallel computing system 1, the processing element 12 in each computing node outputs the packet to the first virtual channel in the right direction or the left direction. Between the computing nodes 2-1 and 2-2, between the computing nodes 2-3 and 2-4, and between the computing nodes 2-4 and 2-1, the packet is not changed from the first virtual channel to the second virtual channel or from the second virtual channel to the first virtual channel. On the contrary, between the computing nodes 2-2 and 2-3, the packet is changed from the first virtual channel to the second virtual channel. This is because the occurrence of a deadlock in the ring network or the torus network avoids. The deadlock means that, when either of the virtual channels connected to the ring network or the torus network retards a process of a received packet according to some cause, a process of another packet which exists in the ring network or the torus network is retarded, so that a process of all packets which exist in the ring network or the torus network is retarded. In this case, a virtual channel change line in which the packet changes from the first virtual channel to the second virtual channel between the computing nodes 2-2 and 2-3 needs to be set to the parallel computing system 1. Specifically, an administrator of the parallel computing system sets a routing rule in which the packet changes from the first virtual channel to the second virtual channel, to the routing logical circuit 44 in the computing node 2-2. For example, when the input-output node 3 is deleted from the parallel computing system 1 of FIG. 1, the administrator of the parallel computing system sets the routing rule in which the packet changes from the first virtual channel to the second virtual channel, to the routing logical circuit 44 in the computing node which outputs the packet to the input-output node 3. Thereby, it is avoidable that the deadlock occurs in the ring network or the torus network.

Figure 5:
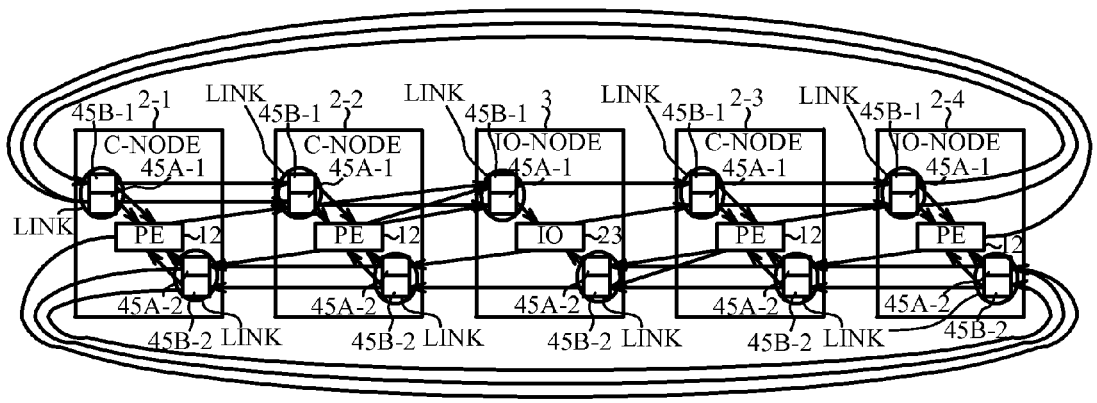
FIG. 5 is a diagram illustrating a dependency between virtual channels in the parallel computing system of FIG. 1.

FIG. 5 is a diagram illustrating a dependency between the virtual channels in the parallel computing system 1 of FIG. 1.

In FIG. 5, the configuration of the computing nodes 2-1 to 2-4 and the input-output node 3 is illustrated schematically. Each of the computing nodes 2-1 to 2-4 includes the processing element 12, and virtual channel buffers 45A-1, 45B-1, 45A-2 and 45B-2. Each of the computing nodes 2-1 to 2-4 and the input-output node 3 includes two links connected to the adjacent nodes. Each link includes the first virtual channel and the second virtual channel. Here, the number of links included in each node has to be plural number, but is not limited to two. A route which passes through the virtual channel buffer 45A-1 constitutes the first virtual channel in the right direction. A route which passes through the virtual channel buffer 45B-1 constitutes the second virtual channel in the right direction. A route which passes through the virtual channel buffer 45A-2 constitutes the first virtual channel in the left direction. A route which passes through the virtual channel buffer 45B-2 constitutes the second virtual channel in the left direction.

In the routing role of the parallel computing system 1 of FIG. 1, the processing element 12 in each of the computing nodes 2-1 and 2-4 outputs the packet to the first virtual channel in the right direction or the left direction. The processing element 12 in the computing node 2-2 outputs the packet to the first virtual channel in the left direction, or outputs the packet to the first virtual channel in the right direction or the second virtual channel in the right direction. When the destination of the packet to be outputted in the right direction is the input-output node 3, the processing element 12 in the computing node 2-2 outputs the packet to the first virtual channel in the right direction. When the destination of the packet to be outputted in the right direction is the computing node other than the input-output node 3, the processing element 12 in the computing node 2-2 outputs the packet to the second virtual channel in the right direction.

The processing element 12 in the computing node 2-4 outputs the packet to the first virtual channel in the right direction, or outputs the packet to the first virtual channel in the left direction or the second virtual channel in the left direction. When the destination of the packet to be outputted in the left direction is the input-output node 3, the processing element 12 in the computing node 2-4 outputs the packet to the first virtual channel in the left direction. When the destination of the packet to be outputted in the left direction is the computing node other than the input-output node 3, the processing element 12 in the computing node 2-4 outputs the packet to the second virtual channel in the left direction.

The packet to be transferred to each computing node is not changed from the first virtual channel to the second virtual channel or from the second virtual channel to the first virtual channel. The packet whose destination is the input-output node 3, among the packets to be transferred to the input-output node 3, does not change the virtual channel. On the contrary, the packet which passes through the input-output node 3, among the packets to be transferred to the input-output node 3, is changed from the first virtual channel to the second virtual channel. Thus, the input-output node 3 plays a role as the virtual channel change line in which the packet passing through the input-output node 3 is changed from the first virtual channel to the second virtual channel.

Each of the first virtual channels in the right and left directions in the input-output node 3 becomes an exclusive virtual channel that lets the packet whose destination is the input-output node 3 arrive at the input-output node 3. The first virtual channel in the computing node which receives the packet from the input-output node 3 becomes an exclusive virtual channel for receiving the packet from the input-output node 3. The first virtual channels in other computing nodes become virtual channels which receive the packets from the adjacent computing nodes. That is, the first virtual channels in the right and left directions in the input-output node 3 and the first virtual channel in the computing node which receives the packet from the input-output node 3 are different from the first virtual channels in other computing nodes in that the packet is received from only the input-output node 3. According to this difference, even when a sending direction of the packet from the input-output node 3 and an arrival direction of the packet to the input-output node 3 differ from transfer directions of the packets between the computing nodes, it is avoidable that the deadlock occurs in the ring network or the torus network.

Figure 6:
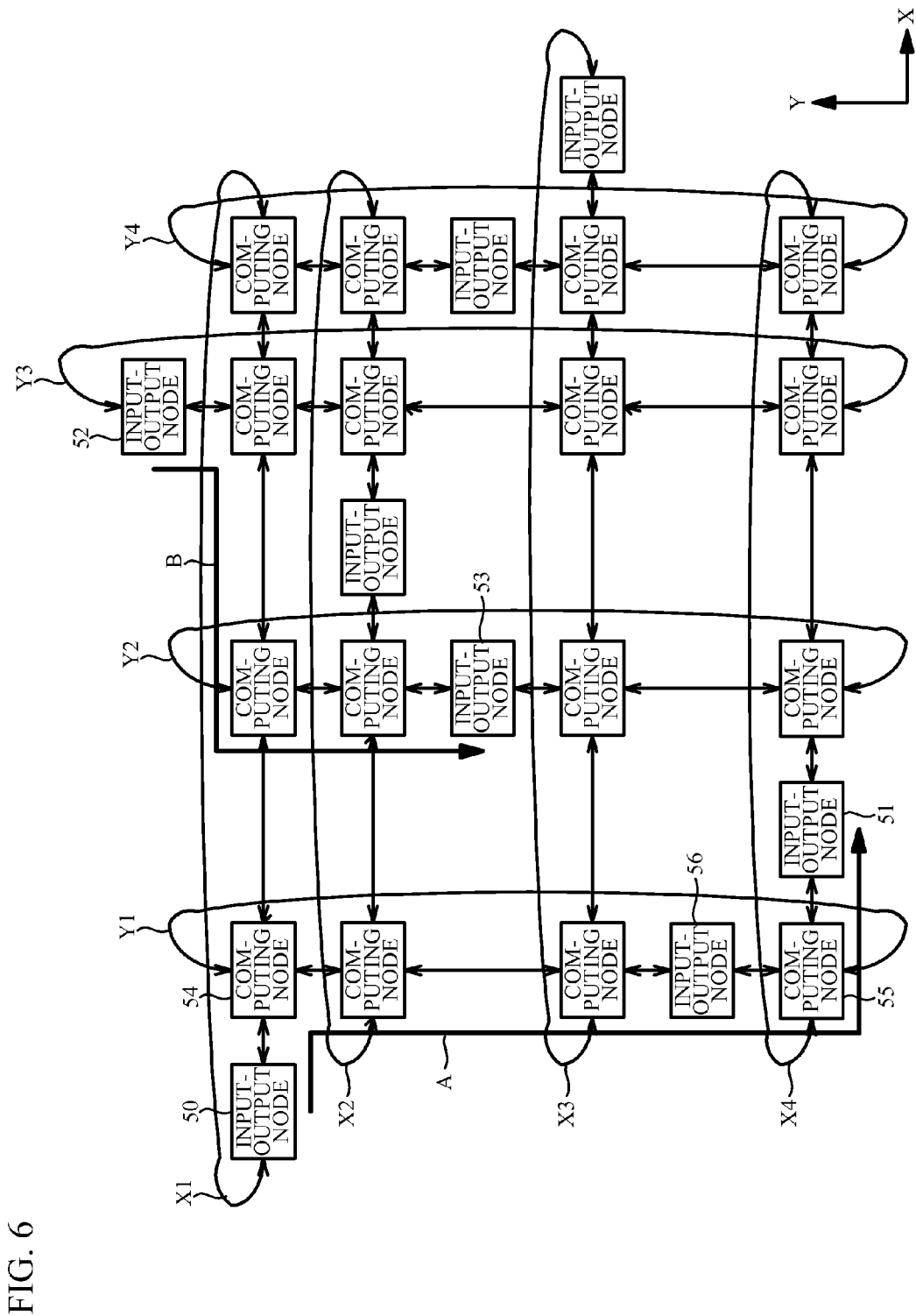
FIG. 6 is a diagram illustrating an example which extended a ring network in the parallel computing system of FIG. 1 to a two-dimensional torus network.

FIG. 6 is a diagram illustrating an example which extended the ring network in the parallel computing system 1 of FIG. 1 to a two-dimensional torus network. In FIG. 6, a vertical direction is a Y-axis, and a horizontal direction is a X-axis. In FIG. 6, one input-output node is added to each axis of the two-dimensional torus network which has connected 4×4 computing nodes. That is, each of axes X1 to X4 and axes Y1 to Y4 includes four computing nodes and one input-output node.

When dimension-order routing which is the same as the routing of the conventional torus network is assumed, the packet can go straight on the X-axis or the Y-axis only once. The packet cannot pass through the X-axis or the Y-axis twice, as illustrated by a route A (axis X1->axis Y1->axis X4) or a route B (axis Y3->axis X1->axis Y2) of FIG. 6. If the packet passes through the X-axis or the Y-axis twice, it is easy to generate a state where all the virtual channels process the packet, and hence a possibility that the deadlock occurs in the torus network increases.

On the contrary, in the present embodiment, each of the first virtual channels in the right and left directions in the input-output node becomes an exclusive virtual channel that causes the packet whose destination is the input-output node to reach the input-output node, and the first virtual channel in the computing node which receives the packet from the input-output node becomes an exclusive virtual channel for receiving the packet from the input-output node, as described above. Therefore, since one hop to be outputted and inputted to/from the input-output node does not use the virtual channels to be used for the communication between the computing nodes, the computing node which receives the packet from the input-output node and the computing node which transmits the packet to the input-output node can determine a direction of movement of the packet freely. That is, since the above-mentioned two exclusive virtual channels are provided, the one hop to be outputted and inputted to/from the input-output node is independent of the dimension-order routing of the torus network. Therefore, in the route A of FIG. 6, the sending direction of the packet from an input-output node 50 and the arrival direction of the packet to an input-output node 51 (i.e., the X-axis) differ from the transfer direction of the packet between the computing nodes 54 and 55 (i.e., the Y-axis), but the deadlock does not occur in the two-dimensional torus network. Similarly, also in the route B of FIG. 6, the deadlock does not occur in the two-dimensional torus network of FIG. 6. Therefore, the input-output nodes 50 and 51 on the different X-axes can communicate mutually. Similarly, the input-output nodes 52 and 53 on the different Y-axes can communicate mutually.

Also, an input-output node 56 provided between the computing nodes 54 and 55 on the axis Y1 plays the role of the virtual channel change line. Therefore, a route between the computing nodes 54 and 55 on the axis Y1 is considered as the ring network or the torus network which does not have an extension portion virtually, the regular communication can be performed, and the network can be used efficiently.

Figure 7:
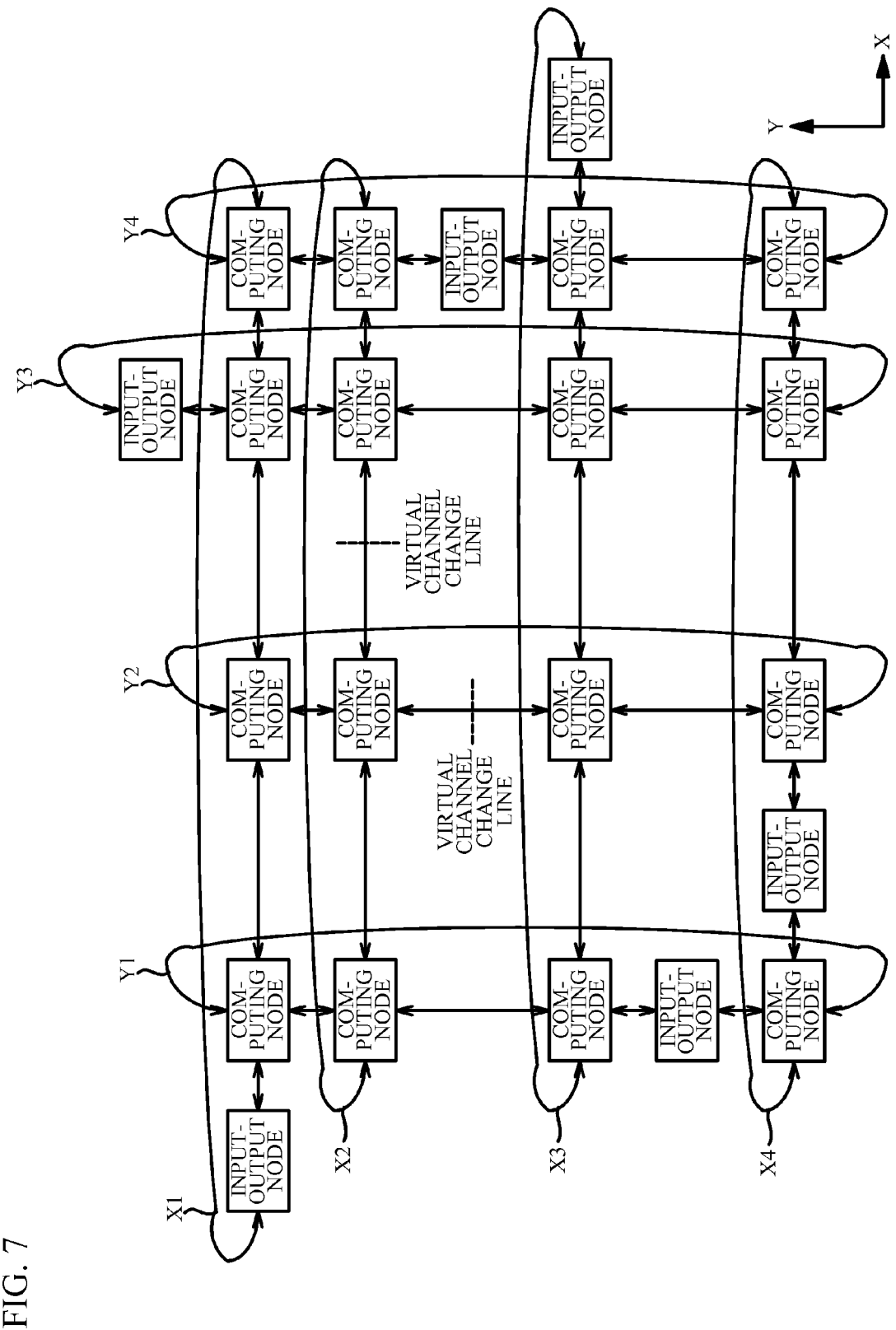
FIG. 7 is a diagram illustrating a variation example of the two-dimensional torus network of FIG. 6.

FIG. 7 is a diagram illustrating a variation example of the two-dimensional torus network of FIG. 6.

The ring network in the parallel computing system 1 can extend to the two-dimensional torus network of FIG. 7. In the two-dimensional torus network of FIG. 7, the axes X2 and Y2 which do not include the input-output node are intermingled with the axes X1, X3, X4, Y1, Y3 and Y4 including the input-output node. In this case, a user sets the virtual channel change line illustrated in FIG. 4 to the axes X2 and Y2. Specifically, the user sets the routing rule in which the packet is changed from the first virtual channel to the second first virtual, to the routing logical circuit 44 in any one of the computing nodes on the axis X2 and any one of the computing nodes on the axis Y2. Thereby, it is avoidable that the deadlock occurs in the axes X2 and Y2.

Here, not only the two-dimensional torus network as illustrated in FIG. 6 or FIG. 7 but also a three-dimensional torus network can be employed to the parallel computing system 1.

Figure 8:
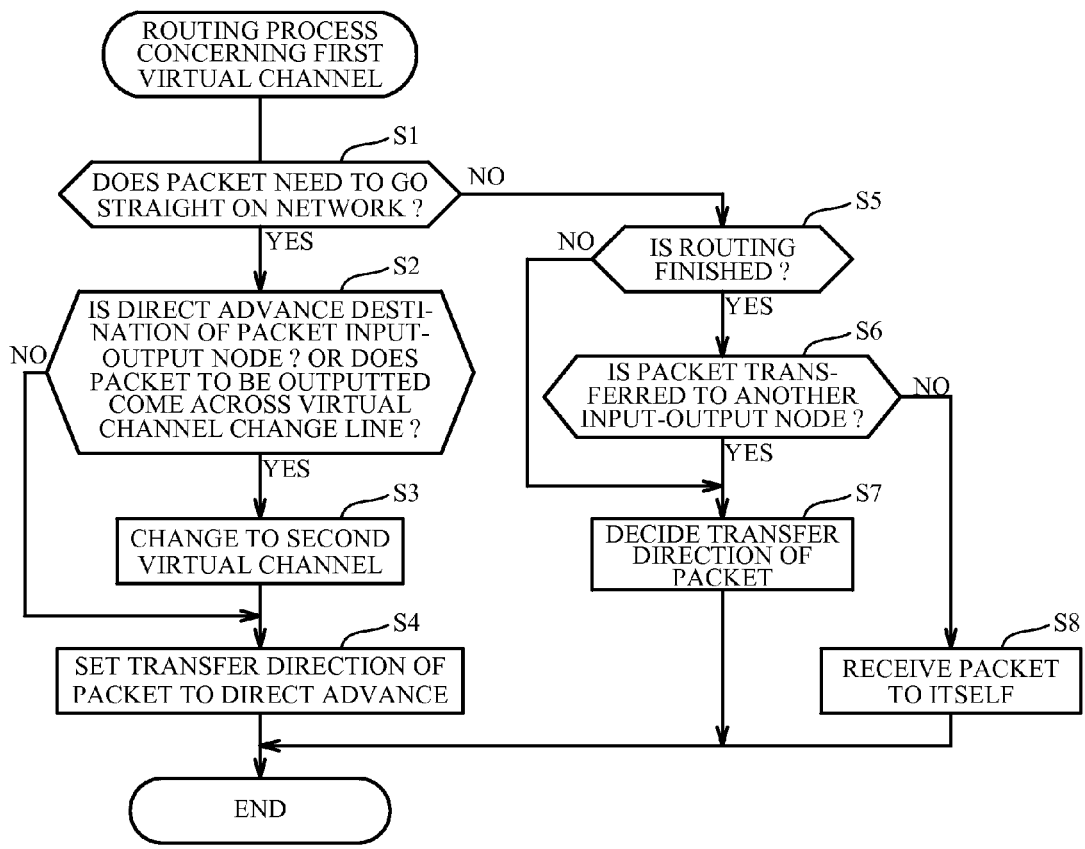
FIG. 8 is a flowchart illustrating a routing process concerning a first virtual channel performed by each computing node.

FIG. 8 is a flowchart illustrating a routing process concerning the first virtual channel performed by each computing node.

First, the routing logical circuit 44 of the router 11 included in each computing node determines whether the packet needs to go straight on the torus network, based on the destination of the packet included in the header of the packet (step S1). When the routing logical circuit 44 determines that the packet needs to go straight on the torus network (YES in step S1), the routing logical circuit 44 determines whether a direct advance destination of the packet is the input-output node or the packet to be outputted comes across the virtual channel change line (step S2).

When the routing logical circuit 44 determines that the direct advance destination of the packet is the input-output node or the packet to be outputted comes across the virtual channel change line (YES in step S2), the routing logical circuit 44 changes the channel which transfers the packet, from the first virtual channel to the second virtual channel (step S3). The routing logical circuit 44 sets the transfer direction of the packet to a direct advance direction (step S4). Then, the present process is terminated. When the routing logical circuit 44 determines that the direct advance destination of the packet is not the input-output node or the packet to be outputted does not come across the virtual channel change line (NO in step S2), the procedure proceeds to the above-mentioned step S4.

When the routing logical circuit 44 determines that the packet does not need to go straight on the torus network (NO in step S1), the routing logical circuit 44 determines whether to finish the routing of the torus network, based on the destination of the packet included in the header of the packet (step S5). Here, the routing logical circuit 44 determines whether to finish the routing in which the packet goes ahead through the X-axis, the Y-axis, or the Z-axis, based on the destination of the packet included in the header of the packet.

When the routing logical circuit 44 determines to finish the routing of the torus network (YES in step S5), the routing logical circuit 44 determines whether to transfer the packet to another input-output node (i.e., another input-output node different from the input-output node in step S2), based on the destination of the packet included in the header of the packet (step S6). When the routing logical circuit 44 determines to transfer the packet to the another input-output node (YES in step S6), the routing logical circuit 44 decides the transfer direction of the packet (step S7). Here, the routing logical circuit 44 decides the transfer direction of the packet to the direction of the another input-output node.

When the routing logical circuit 44 determines not to finish the routing of the torus network (NO in step S5), the routing logical circuit 44 decides the transfer direction of the packet (step S7). In the parallel computing system 1, a priority is decided in advance for every axis, and the routing logical circuit 44 decides the transfer direction of the packet according to the priority of each axis decided in advance. When it is set that the packet that has gone ahead through the X-axis goes ahead in the Y-direction in preference to the Z-direction, the packet that has gone ahead through the X-axis goes ahead in the Y-direction next. After step S7, the present process is terminated. When the routing logical circuit 44 determines not to transfer the packet to the another input-output node (NO in step S6), the routing logical circuit 44 receives the packet as a packet to itself (step S8). Then, the present process is terminated.

Figure 9:
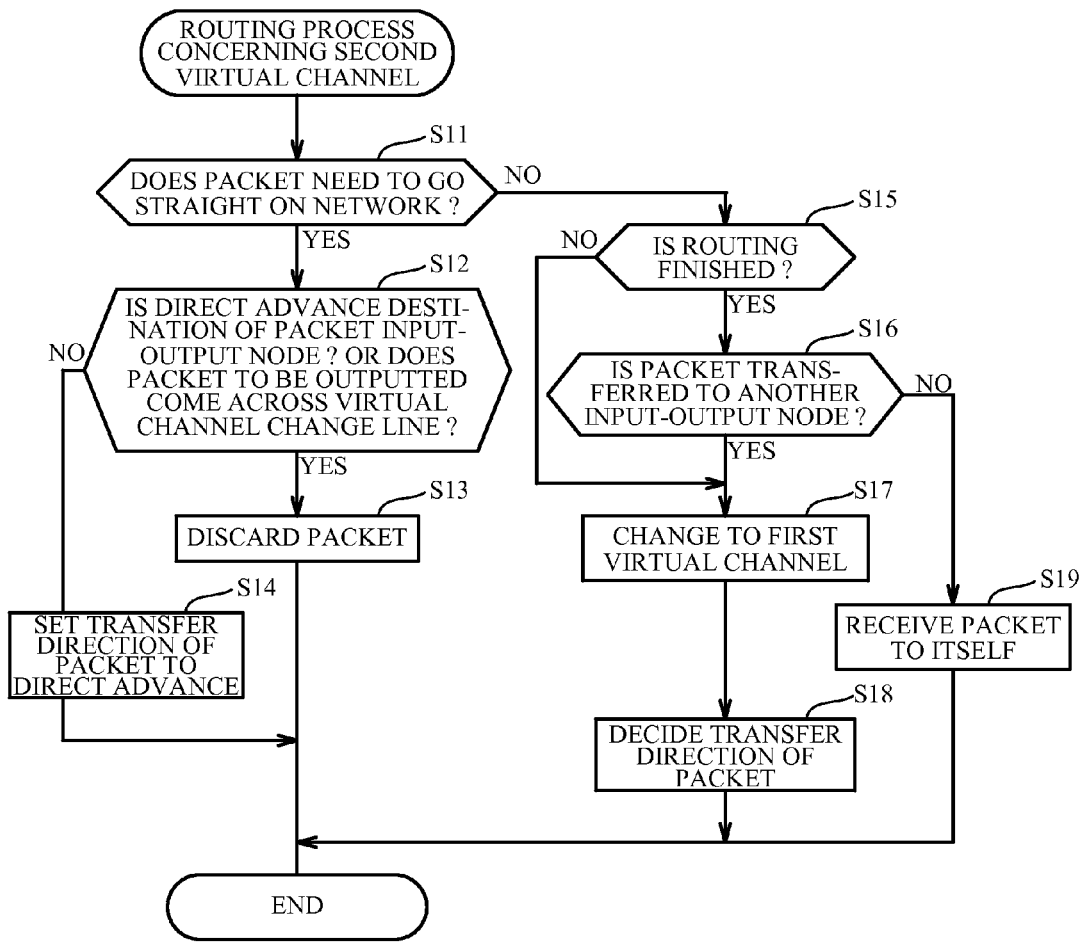
FIG. 9 is a flowchart illustrating a routing process concerning a second virtual channel performed by each computing node.

FIG. 9 is a flowchart illustrating a routing process concerning the second virtual channel performed by each computing node.

First, the routing logical circuit 44 of the router 11 included in each computing node determines whether the packet needs to go straight on the torus network, based on the destination of the packet included in the header of the packet (step S11). When the routing logical circuit 44 determines that the packet needs to go straight on the torus network (YES in step S11), the routing logical circuit 44 determines whether the direct advance destination of the packet is the input-output node or the packet to be outputted comes across the virtual channel change line (step S12).

When the routing logical circuit 44 determines that the direct advance destination of the packet is the input-output node or the packet to be outputted comes across the virtual channel change line (YES in step S12), the routing logical circuit 44 discards the packet (step S13). Then, the present process is terminated. On the contrary, when the routing logical circuit 44 determines that the direct advance destination of the packet is not the input-output node or the packet to be outputted does not come across the virtual channel change line (NO in step S12), the routing logical circuit 44 sets the transfer direction of the packet to a direct advance direction (step S14). Then, the present process is terminated.

When the routing logical circuit 44 determines that the packet does not need to go straight on the torus network (NO in step S11), the routing logical circuit 44 determines whether to finish the routing of the torus network, based on the destination of the packet included in the header of the packet (step S15). Here, the routing logical circuit 44 determines whether to finish the routing in which the packet goes ahead through the X-axis, the Y-axis, or the Z-axis, based on the destination of the packet included in the header of the packet.

When the routing logical circuit 44 determines to finish the routing of the torus network (YES in step S15), the routing logical circuit 44 determines whether to transfer the packet to another input-output node (another input-output node different from the input-output node in step S12), based on the destination of the packet included in the header of the packet (step S16). When the routing logical circuit 44 determines to transfer the packet to the another input-output node (YES in step S16), the routing logical circuit 44 changes a channel to which the packet is transferred, from the second virtual channel to the first virtual channel (step S17). The routing logical circuit 44 decides the transfer direction of the packet (step S18). Here, the routing logical circuit 44 decides the transfer direction of the packet to the direction of the another input-output node. After step S18, the present process is terminated.

When the routing logical circuit 44 determines not to finish the routing of the torus network (NO in step S15), the procedure proceeds to step S17 described above. When the routing logical circuit 44 determines not to transfer the packet to the another input-output node (NO in step S16), the routing logical circuit 44 receives the packet as a packet to itself (step S19). Then, the present process is terminated.

Figure 10:
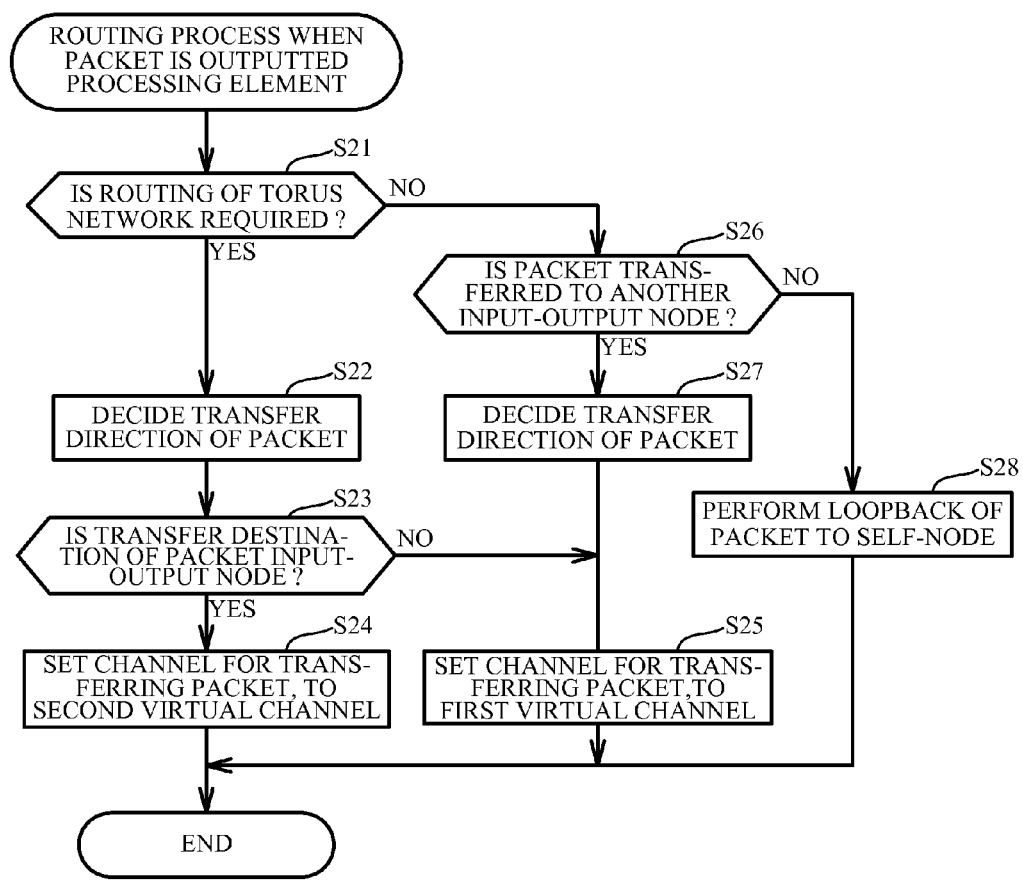
FIG. 10 is a flowchart illustrating a routing process when a packet is outputted from a processing element of each computing node.

FIG. 10 is a flowchart illustrating a routing process when the packet is outputted from the processing element 12 of each computing node.

First, the routing logical circuit 44 of the router 11 included in each computing node determines whether the routing of the torus network is required, based on the destination of the packet included in the header of the packet (step S21). When the routing logical circuit 44 determines that the routing of the torus network is required (YES in step S21), the routing logical circuit 44 decides the transfer direction of the packet (step S22). Here, the routing logical circuit 44 decides the transfer direction of the packet according to the priority of each axis decided in advance.

The routing logical circuit 44 determines whether a transfer destination of the packet is the input-output node (step S23). When the routing logical circuit 44 determines that the transfer destination of the packet is the input-output node (YES in step S23), the routing logical circuit 44 sets the channel to which the packet is transferred, to the second virtual channel (step S24). Then, the present process is terminated. On the other hand, when the routing logical circuit 44 determines that the transfer destination of the packet is not the input-output node (NO in step S23), the routing logical circuit 44 sets the channel to which the packet is transferred, to the first virtual channel (step S25). Then, the present process is terminated.

When the routing logical circuit 44 determines that the routing of the torus network is not required (NO in step S21), the routing logical circuit 44 determines whether to transfer the packet to another input-output node (another input-output node different from the input-output node in step S23), based on the destination of the packet included in the header of the packet (step S26). When the routing logical circuit 44 determines to transfer the packet to another input-output node (YES in step S26), the routing logical circuit 44 decided the transfer direction of the packet (step S27). Here, the routing logical circuit 44 decides the transfer direction of the packet to the direction of the another input-output node. Then, the procedure proceeds to step S25. When the routing logical circuit 44 determines not to transfer the packet to another input-output node (NO in step S26), the routing logical circuit 44 performs the loopback of the packet to a self-node (step S28). Then, the present process is terminated.

Figure 11A:
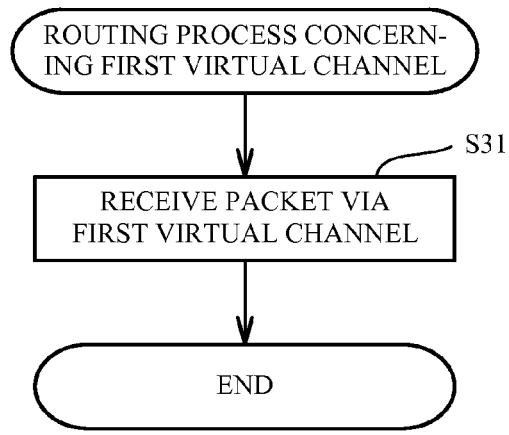
FIG. 11A is a flowchart illustrating a routing process concerning the first virtual channel performed by each input-output node.
Figure 11B:
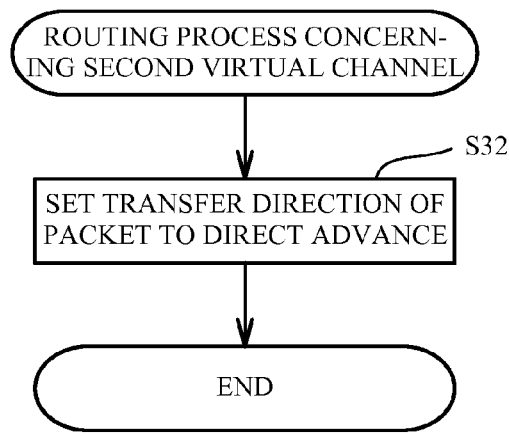
FIG. 11B is a flowchart illustrating a routing process concerning the second virtual channel performed by each input-output node.
Figure 11C:
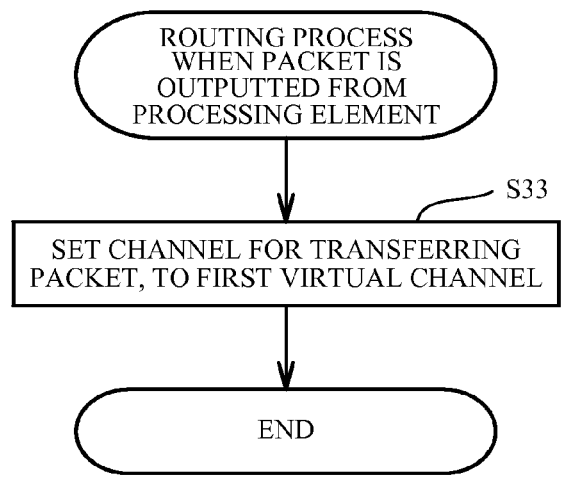
FIG. 11C is a flowchart illustrating a routing process when a packet is outputted from a processing element of each input-output node.

FIG. 11A is a flowchart illustrating a routing process concerning the first virtual channel performed by each input-output node. FIG. 11B is a flowchart illustrating a routing process concerning the second virtual channel performed by each input-output node. FIG. 11C is a flowchart illustrating a routing process when the packet is outputted from the processing element 22 of each input-output node.

In FIG. 11A, the routing logical circuit 44 of the router 21 included in each input-output node receives the packet from the adjacent computing node via the first virtual channel (step S31). The first virtual channel of each input-output node becomes an exclusive virtual channel that causes the packet to reach each input-output node. Then, the present process is terminated.

In FIG. 11B, the routing logical circuit 44 of the router 21 included in each input-output node sets the transfer direction of the packet to the direct advance (step S32). Thus, the second virtual channel is a virtual channel which passes the packet. Then, the present process is terminated.

In FIG. 11C, the routing logical circuit 44 of the router 21 included in each input-output node sets the channel to which the packet is transferred, to the first virtual channel (step S33). The first virtual channel of the computing node which receives the packet from the input-output node becomes an exclusive virtual channel which receives the packet from the input-output node. Then, the present process is terminated.

According to the present embodiment, the parallel computing system 1 connects the computing nodes and the input-output node by using the single ring network or the single torus network. Then, the first virtual channel of the input-output node is set to the exclusive virtual channel which causes data whose destination is the input-output node itself to reach the input-output node. The first virtual channel of the computing node which receives data from the input-output node is set to the exclusive virtual channel which receives the data from the input-output node. Therefore, the one hop to be outputted and inputted to/from the input-output node does not use the virtual channels to be used for the communication between the computing nodes, so that the deadlock does not occur in the ring network or the torus network, and it is possible to communicate between the computing nodes with the regular communication pattern.

When the input-output node is deleted from the single ring network or the single torus network, the computing nodes connected to both ends of the input-output node is connected to each other. Moreover, the setting in which data to be outputted is changed from the first virtual channel to the second virtual channel is set to the computing node which has outputted data to the input-output node. Therefore, the deadlock does not occur in the ring network or the torus network, and it is possible to communicate between the computing nodes with the regular communication pattern.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A parallel computing system that has an input-output node and a plurality of computing nodes, the input-output node being connected to the computing nodes via a first and a second transmission paths in which data is transferred in a first direction, the parallel computing system comprising:

each of the plurality of computing nodes including:
a first channel that receives data which an adjacent preceding input-output node or adjacent preceding computing node transfers, and transfers the received data to an adjacent subsequent input-output node or adjacent subsequent computing node via the first transmission path;
a second channel that receives data which an adjacent preceding input-output node or adjacent preceding computing node transfers, and transfers the received data to an adjacent subsequent input-output node or adjacent subsequent computing node via the second transmission path; and
a computational processor that receives data which the first or second channel has received, and transfer processed data to an adjacent subsequent input-output node or adjacent subsequent computing node;

the input-output node including:
a third channel that receives data which the first channel of an adjacent preceding computing node transfers or data which the computational processor of an adjacent preceding computing node transfers;
a fourth channel that receives data which the first channel of an adjacent preceding computing node transfers or data which the computational processor of an adjacent preceding computing node transfers, and transfers the received data to the second channel of an adjacent subsequent computing node via the second transmission path; and
an input-output processor that receives data which the third channel has received, and transfers inputted and outputted data to the first channel of an adjacent subsequent computing node.

2. The parallel computing system as claimed in claim 1, wherein when the first channel of a preceding computing node adjacent to the input-output node transfers the received data to the input-output node, the first channel transfers the received data to the fourth channel.

3. The parallel computing system as claimed in claim 1, wherein when the computational processor of a preceding computing node adjacent to the input-output node transfers the processed data to the input-output node, the computational processor transfers processed data to the fourth channel.

4. The parallel computing system as claimed in claim 1, wherein the input-output node is further connected to the computing nodes via a third and a fourth transmission paths in which data is transferred in a second direction, each of the plurality of computing nodes further including:
a fifth channel that receives data which an adjacent subsequent input-output node or adjacent subsequent computing node transfers, and transfers the received data to an adjacent preceding input-output node or adjacent preceding computing node via the third transmission path; and
a sixth channel that receives data which an adjacent subsequent input-output node or adjacent subsequent computing node transfers, and transfers the received data to an adjacent preceding input-output node or adjacent preceding computing node via the fourth transmission path;
wherein the computational processor further receives data which the third or fourth channel has received, and transfer processed data to an adjacent preceding input-output node or adjacent preceding computing node;
the input-output node further including:
a seventh channel that receives data which the fifth channel of an adjacent subsequent computing node transfers or data which the computational processor of an adjacent subsequent computing node transfers; and
an eighth channel that receives data which the sixth channel of an adjacent subsequent computing node transfers or data which the computational processor of an adjacent subsequent computing node transfers, and transfers the received data to the sixth channel of an adjacent preceding computing node via the fourth transmission path;
wherein the input-output processor further that receives data which the seventh channel has received, and transfers inputted and outputted data to the fifth channel of an adjacent preceding computing node.

5. The parallel computing system as claimed in claim 4, wherein when the fifth channel of a subsequent computing node adjacent to the input-output node transfers the received data to the input-output node, the fifth channel transfers the received data to the eighth channel.

6. The parallel computing system as claimed in claim 4, wherein when the computational processor of a subsequent computing node adjacent to the input-output node transfers the processed data to the input-output node, the computational processor transfers the processed data to the eighth channel.

7. A control method of a parallel computing system that has an input-output node and a plurality of computing nodes, the input-output node being connected to the computing nodes via a first and a second transmission paths in which data is transferred in a first direction, the control method comprising:

receiving data which an adjacent preceding input-output node or adjacent preceding computing node transfers, transferring the received data to an adjacent subsequent input-output node or adjacent subsequent computing node via the first transmission path, by a first channel included in any of the computing nodes;

receiving data which an adjacent preceding input-output node or adjacent preceding computing node transfers, and transferring the received data to an adjacent subsequent input-output node or adjacent subsequent computing node via the second transmission path, by a second channel included in any of the computing nodes;

receiving data which the first or second channel has received, and transferring processed data to an adjacent subsequent input-output node or adjacent subsequent computing node, by a computational processor included in any of the computing nodes;

receiving data which the first channel of an adjacent preceding computing node transfers or data which the computational processor of an adjacent preceding computing node transfers, by a third channel included in the input-output node;

receiving data which the first channel of an adjacent preceding computing node transfers or data which the computational processor of an adjacent preceding computing node transfers, and transferring the received data to the second channel of an adjacent subsequent computing node via the second transmission path, by a fourth channel included in the input-output node; and receiving data which the third channel has received, and transferring inputted and outputted data to the first channel of an adjacent subsequent computing node, by an input-output processor included in the input-output node.

* * * * *